(12) United States Patent
Ye et al.

(10) Patent No.: US 8,812,623 B2
(45) Date of Patent: Aug. 19, 2014

(54) TECHNIQUES TO SUPPORT SELECTIVE MOBILE CONTENT OPTIMIZATION

(75) Inventors: Yinghua Ye, Santa Clara, CA (US); Ram Gopal Lakshmi Narayanan, Sunnyvale, CA (US)

(73) Assignee: Nokia Siemens Networks Oy, Espoo (FI)

( * ) Notice: Subject to any disclaimer, the term of this patent is extended or adjusted under 35 U.S.C. 154(b) by 82 days.

(21) Appl. No.: 13/550,925

(22) Filed: Jul. 17, 2012

(65) Prior Publication Data

US 2014/0025781 A1    Jan. 23, 2014

(51) Int. Cl.
    G06F 15/16        (2006.01)
(52) U.S. Cl.
    USPC ........... 709/219; 709/231; 709/206; 709/232; 709/217; 725/46; 725/50; 725/53; 725/54; 705/35; 705/37
(58) Field of Classification Search
    USPC ......... 709/219, 229, 231, 206, 232, 217, 227, 709/228, 238
    See application file for complete search history.

(56) References Cited

U.S. PATENT DOCUMENTS

| | | | |
|---|---|---|---|
| 2003/0158913 A1 | 8/2003 | Agnoli et al. | |
| 2004/0187076 A1* | 9/2004 | Ki et al. | 715/513 |
| 2006/0020684 A1 | 1/2006 | Mukherjee et al. | 709/219 |
| 2007/0260604 A1* | 11/2007 | Haeuser et al. | 707/9 |
| 2009/0198608 A1* | 8/2009 | Jain et al. | 705/37 |
| 2009/0282052 A1* | 11/2009 | Evans et al. | 707/10 |
| 2010/0057924 A1* | 3/2010 | Rauber et al. | 709/229 |
| 2011/0131298 A1 | 6/2011 | Courtemanche et al. | |
| 2011/0296046 A1 | 12/2011 | Arya et al. | 709/231 |

FOREIGN PATENT DOCUMENTS

| | | |
|---|---|---|
| WO | WO 98/43177 A1 | 10/1998 |
| WO | WO-2008/027841 A2 | 3/2008 |

OTHER PUBLICATIONS

"3rd Generation Partnership Project; Technical Specification Group Services and System Aspects' Telecommunication management; Performance Management (PM); Performance measurements Evolved Universal Terrestrial Radio Access Network (E-UTRAN) (Release 11)", 3GPP TS 32.425 V11.2.0, Mar. 2012, 67 pgs.

"Hypertext Transfer Protocol—HTTP/1.1", R. Fielding et al., RFC 2616, Jun. 1999, 176 pgs.

"Cisco Visual Networking Index: Global Mobile Data Traffic Forecast Update, 2011-2016", Cisco, Feb. 14, 2012, 29 pgs.

(Continued)

*Primary Examiner* — Jude Jean Gilles
(74) *Attorney, Agent, or Firm* — Harrington & Smith

(57) ABSTRACT

A method performed at an apparatus includes receiving a request for media content corresponding to a user equipment; requesting and receiving some of the media content from a server; and if the requested media content should not be optimized, sending, through the network toward the user equipment, information that causes a node to direct additional requests from the user equipment for the media content through the network toward the server without passing through the apparatus. Another method includes receiving a redirect message comprising an indication corresponding to a location of media content and comprising a tag indicating the redirect message should cause a first apparatus to redirect requests from a user equipment for the media content to a server having the media content without passing through a second apparatus; and for requests received from the user equipment and corresponding to the indication, forwarding requests through the network toward the server.

20 Claims, 12 Drawing Sheets

(56) References Cited

OTHER PUBLICATIONS

"Percent-encoding", http://en.wikipedia.org/wiki/Percent-encoding; May 15, 2012, 5 pgs.
"POST (HTTP)", http://en.wikipedia.org/wiki/POST_(HTTP); May 15, 2012, 2 pgs.
"The Video Network Problem", Skyfire—Mobile Browser and Mobile Video Optimization, Jul. 20, 2012, 2 pgs.
"Overview of Skyfire Rocket", Skyfire Proprietary, Nov. 11, 2011, 30 pgs.
"Wireless Ops Blamed for Poor Mobile Video Quality", Light Reading Mobile, Jan. 31, 2012, 8 pgs.

\* cited by examiner

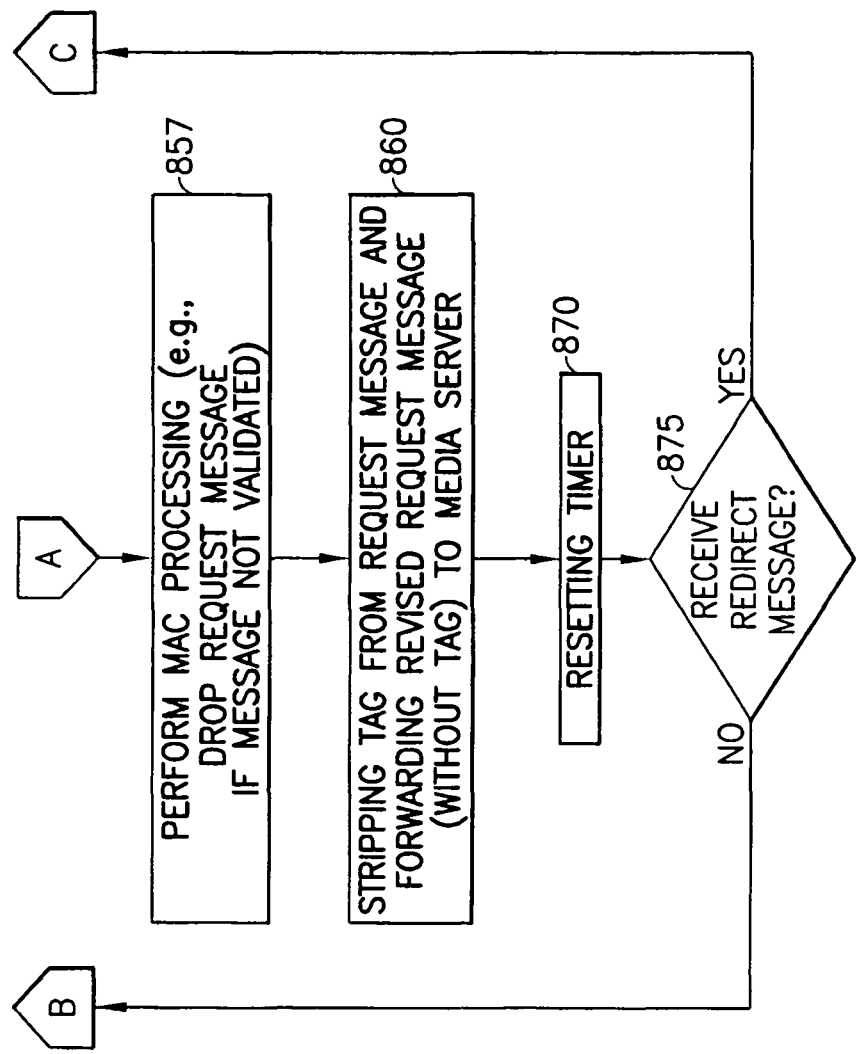

TECHNIQUES TO SUPPORT SELECTIVE MOBILE CONTENT OPTIMIZATION

TECHNICAL FIELD

This invention relates generally to wireless networks and, more specifically, relates to content such as video in wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

| | |
|---|---|
| 3G | Third Generation |
| 3GPP | Third Generation Partnership Project |
| DL | DownLink (from base station to user equipment) |
| DPI | Deep Packet Inspection |
| eNB or eNode B | evolved Node B (e.g., LTE base station) |
| EPC | Evolved Packet Core |
| GPRS | General Packet Radio Service |
| http | hypertext transport protocol |
| LTE | Long Term Evolution |
| MAC | Message Authenticate Code |
| MCO | Mobile Content Optimizer |
| Node B | UTRAN base station |
| PGW | Packet Gateway |
| QoE | Quality of Experience |
| QoS | Quality of Service |
| RF | Radio Frequency |
| RNC | Radio Network Controller |
| Rx | Receiver or reception |
| SGSN | Serving GPRS Support Node |
| SSL | Secure Sockets Layer |
| Tx | Transmitter or transmission |
| UE | User Equipment |
| UL | UpLink |
| URI | Uniform Resource Identifier |
| URL | Uniform Resource Locator |
| UTRAN | Universal Terrestrial Radio Access Network |

With the increasing popularity of smart phones, tablets, and other portable wireless devices, mobile data traffic continues and is expected to grow at a compound annual growth rate (CAGR) of 92 percent from 2010 to 2015, reaching 6.3 exabytes per month by 2015, and two-thirds of the world's mobile data traffic is expected to be video by 2015. This has brought many challenges to operator networks. For instance, one survey showed that 74 percent of mobile users hold operators most responsible for the user's video stalling, buffering or taking too long to start when streaming over the operator's mobile network, and has found that slow browsing speed would cause 43 percent of respondents to consider switching operators, while another 24 percent said that buffering and poor video quality would cause them to consider switching. Further, 47 percent of mobile users said they are frustrated when video takes too long to play and 45 percent are most discouraged by non-continuous, interrupted play.

A goal of media optimization, particularly video optimization, is to improve efficiency without compromising on the quality of experience (QoE) of the users. Mobile video content optimization has been used as an effective tool for operators to reduce excessive mobile data entering mobile networks without sacrificing user experience. A study indicated that only two percent of the http transactions are video transactions, yet these transactions are responsible for 60 percent of network bandwidth utilization. As a majority of mobile data traffic is http-based video, the mobile optimization is targeting at mobile video type of applications. Operators have been deploying mobile content optimizer (MCO) in their networks and this optimization is not visible to end-users. The goal of these optimizers is to work in favor of an operator, improve the network utilization, and increase the number of user traffic sessions at any given time. There are a number of popular companies that are being tested in operator network. Even though all of these products have similar design goals, they have subtle differences in their architecture and hence their solutions.

While these products are useful, improvements could still be made to improve content optimization.

SUMMARY

This section contains examples of possible implementations and is not meant to be limiting.

In one example, a method is disclosed that includes receiving at an apparatus a request for media content, the request corresponding to a user equipment wirelessly connected to a base station in a wireless network. The method includes requesting and receiving by the apparatus a portion of the media content from a server, and, responsive to a determination the requested media content should not be optimized, sending, through the network toward the user equipment, by the apparatus information that causes a network node to direct additional requests from the user equipment for the media content through the network toward the server without passing through the apparatus.

In an additional exemplary embodiment, an apparatus is disclosed that includes: means for receiving at an apparatus a request for media content, the request corresponding to a user equipment wirelessly connected to a base station in a wireless network; means for requesting and receiving by the apparatus a portion of the media content from a server; and means, responsive to a determination the requested media content should not be optimized, for sending, through the network toward the user equipment, by the apparatus information that causes a network node to direct additional requests from the user equipment for the media content through the network toward the server without passing through the apparatus.

In another exemplary embodiment, a computer program product is disclosed that includes a computer-readable storage medium bearing computer program code embodied therein for use with an apparatus. The computer program code includes code for receiving at an apparatus a request for media content, the request corresponding to a user equipment wirelessly connected to a base station in a wireless network; code for requesting and receiving by the apparatus a portion of the media content from a server; and code for, responsive to a determination the requested media content should not be optimized, sending, through the network toward the user equipment, by the apparatus information that causes a network node to direct additional requests from the user equipment for the media content through the network toward the server without passing through the apparatus.

In a further exemplary embodiment, an apparatus includes one or more processors and one or more memories including computer program code. The one or more memories and the computer program code are configured, with the one or more processors, to cause the apparatus to perform: receiving at an apparatus a request for media content, the request corresponding to a user equipment wirelessly connected to a base station in a wireless network; requesting and receiving by the apparatus a portion of the media content from a server; and responsive to a determination the requested media content should not be optimized, sending, through the network toward the user equipment, by the apparatus information that causes a network node to direct additional requests from the user equipment for the media content through the network toward the server without passing through the apparatus.

Another exemplary embodiment is a method including receiving at a first apparatus in a network from a second apparatus in the network a redirect message comprising an indication corresponding to a location of media content on a network and comprising a tag indicating the redirect message should cause the first apparatus to redirect requests from a user equipment for the media content to a server having the media content without passing through the second apparatus; and for requests received from the user equipment and corresponding to the indication corresponding to the location of the media content on the network, forwarding associated requests through the network toward the server.

In another exemplary embodiment, a computer program product is disclosed that includes a computer-readable storage medium bearing computer program code embodied therein for use with an apparatus. The computer program code includes code for receiving at a first apparatus in a network from a second apparatus in the network a redirect message comprising an indication corresponding to a location of media content on a network and comprising a tag indicating the redirect message should cause the first apparatus to redirect requests from a user equipment for the media content to a server having the media content without passing through the second apparatus; and code for, for requests received from the user equipment and corresponding to the indication corresponding to the location of the media content on the network, forwarding associated requests through the network toward the server.

In a further exemplary embodiment, an apparatus includes one or more processors and one or more memories including computer program code. The one or more memories and the computer program code are configured, with the one or more processors, to cause the apparatus to perform: receiving at a first apparatus in a network from a second apparatus in the network a redirect message comprising an indication corresponding to a location of media content on a network and comprising a tag indicating the redirect message should cause the first apparatus to redirect requests from a user equipment for the media content to a server having the media content without passing through the second apparatus; and for requests received from the user equipment and corresponding to the indication corresponding to the location of the media content on the network, forwarding associated requests through the network toward the server.

An additional exemplary embodiment is an apparatus comprising: means for receiving at a first apparatus in a network from a second apparatus in the network a redirect message comprising an indication corresponding to a location of media content on a network and comprising a tag indicating the redirect message should cause the first apparatus to redirect requests from a user equipment for the media content to a server having the media content without passing through the second apparatus; and means for requests received from the user equipment and corresponding to the indication corresponding to the location of the media content on the network, forwarding associated requests through the network toward the server.

DETAILED DESCRIPTION OF THE DRAWINGS

Figure 1A:
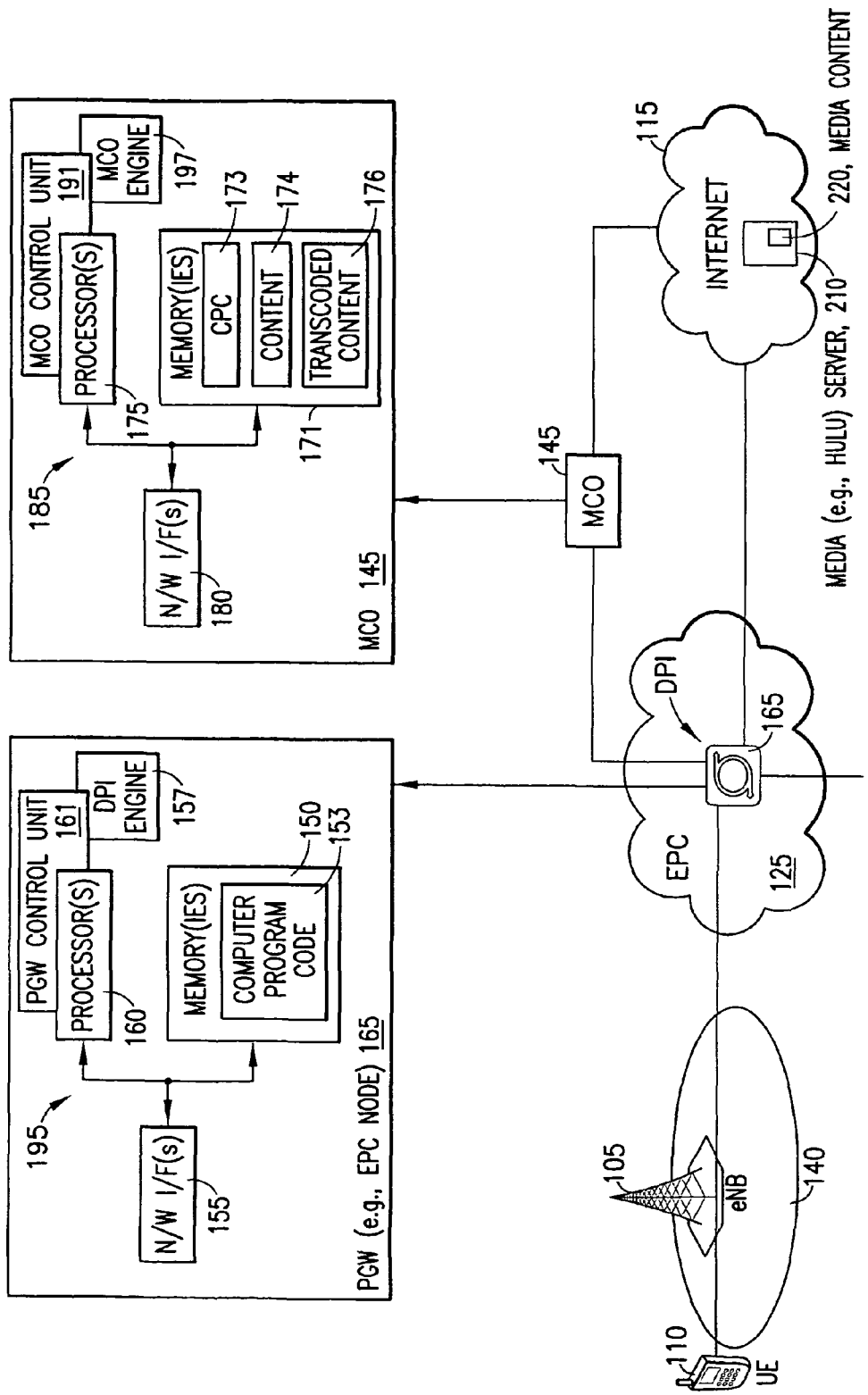
FIG. 1A illustrates an exemplary mobile system optimization architecture in which exemplary embodiments of the invention may be practiced.

The exemplary problems and the solutions proposed herein are applicable to various types of network based optimizers. FIG. 1A shows an exemplary basic mobile optimization architecture, where the mobile content optimizer (MCO) is used to compress videos or images carried through the network, and adapt content format based on mobile device requirement(s). In FIG. 1A, a user equipment (UE) 110 wirelessly connects to an eNB 140 via antenna(s) in the radio tower 105. The eNB 140 connects to the EPC 125, and this example to a PGW 165 in the EPC 125. The PGW 165 can connect to an MCO 145 and the Internet 115. The UE 110 requests media such as image or video content 220 from the media server 210 (in an examples below, a HULU server, though this is in no way a limitation of the exemplary embodiments).

The PGW 165 includes one or more processors 160, one or more memories 150, and one or more network interfaces 155, interconnected through one or more buses 195. The PGW 165 also includes a PGW control unit 161, which may be implemented in logic (e.g., as hardware elements in the one or more processors 160), by the one or more processors 160 in response to execution of the computer program code 153, or by some combination of these. Thus, in an exemplary embodiment, the one or more memories 150 and the computer program code 153 are configured, with the one or more processors 160, to cause the PGW 165 to perform one or more of the operations as described herein. The PGW control unit 161 may cause the PGW 165 to perform, and it is assumed herein that the PGW 165 does perform, DPI of packets using, e.g., a DPI engine 157 (e.g., as part of or separate from the PGW control unit 161). However, the PGW 165 is merely one example of an EPC node that can perform DPI and the other operations described herein.

The MCO 145 can connect to the PGW 165 and to the Internet 115 in this example. The MCO 145 includes one or more processors 175, one or more memories 171, and one or more network interfaces 180, interconnected through one or more buses 185. The MCO 145 also includes an MCO control unit 191, which may be implemented in logic (e.g., as hardware elements in the one or more processors 175), by the one or more processors 175 in response to execution of the computer program code 173, or by some combination of these. Thus, in an exemplary embodiment, the one or more memories 171 and the computer program code 173 are configured, with the one or more processors 175, to cause the MCO 145 to perform one or more of the operations as described herein. One exemplary function of the MCO 145 is to perform transcoding of video using, e.g., the MCO engine 197. In one example, media content 174 is transcoded to transcoded content 176, which is sent by the MCO 145 to the UE 110. The media content 174 is typically some portion of a complete media content (e.g., an image, a video) stored on a server (see media content 220 in FIG. 2).

It is noted that FIG. 1A is only one possible example of a mobile system optimization architecture. Many other configurations are possible. For instance, one or more users can be connected to one or more EPCs 125 (e.g., multiple EPCs 125), and all traffic goes to one MCO 145. That is, one MCO 145 can handle multiple EPCs 125.

Figure 1B:
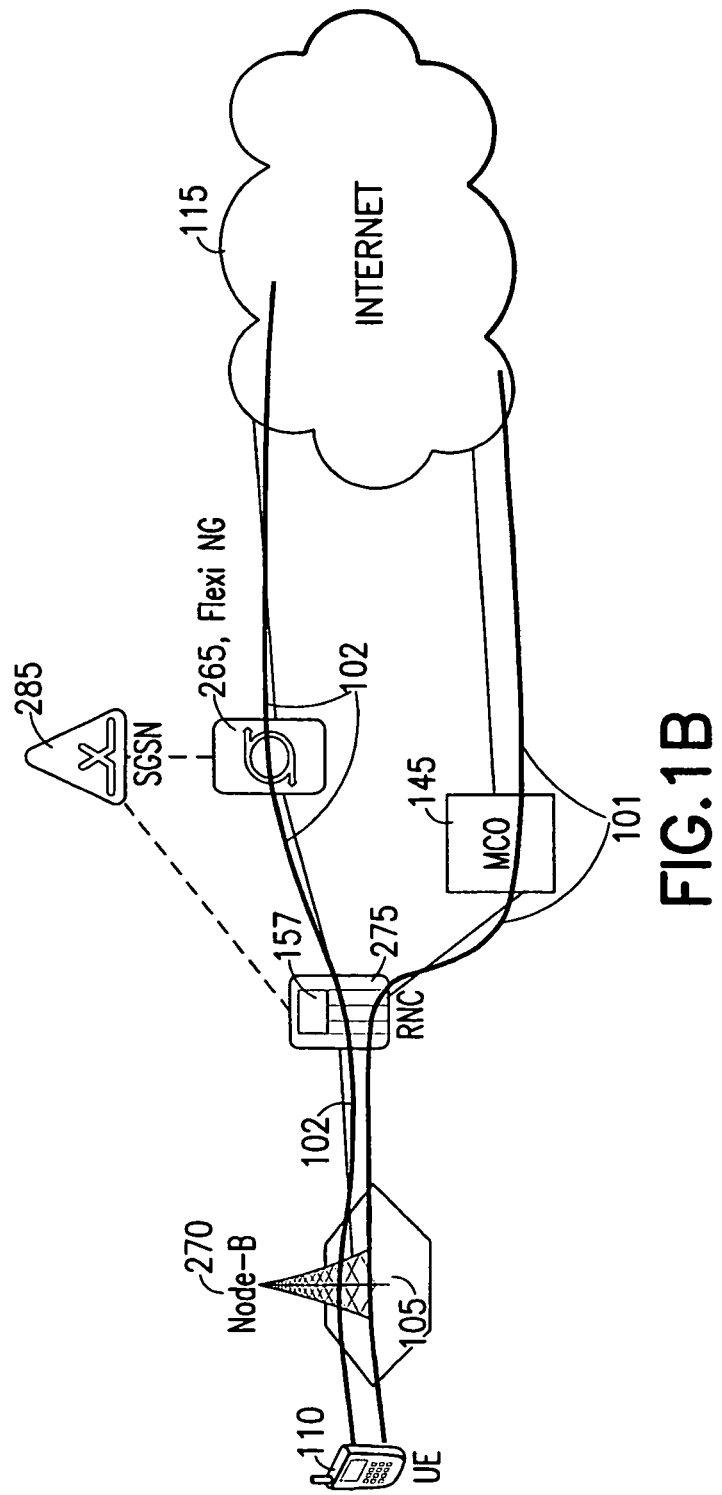
FIG. 1B illustrates another exemplary mobile system optimization architecture in which exemplary embodiments of the invention may be practiced.

FIG. 1B illustrates another exemplary mobile system optimization architecture in which exemplary embodiments of the invention may be practiced. In this example, there is a NodeB 270 (connected to one or more antennas 105), which is connected to an RNC 275. The EPC 125 includes an SGSN 285, a Flexi NG (Flexi network gateway, a mobile gateway from Nokia Siemens Networks) 265, and an MCO 145. The RNC 275 may include the DPI engine 157. The Node B 270, in an example, sends measurement reports every 500-800 milliseconds to the RNC 275. The RNC 275 then provides meaningful radio information to the MCO 145. The radio information may include indications of overall load for the Node B 270, or radio information per UE 110. The MCO 145 may perform video optimization or redirection based on the radio information. Normal mobile content flow 101 is between the UE 110, the NodeB 270, the RNC 275, the MCO 145, and the Internet 115. Mobile content flow 102 with redirect is between the UE 110, the NodeB 270, the RNC 275, the Flexi NG 265, and the Internet. It is noted that the MCO 145 may be also be integrated into the RNC 275.

The computer readable memories 150 and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 160 and 170 may be of any type suitable to the local technical environment, and may include one or more of general purpose computers, special purpose computers, microprocessors, digital signal processors (DSPs) and processors based on a multi-core processor architecture, as non-limiting examples.

Figure 2:
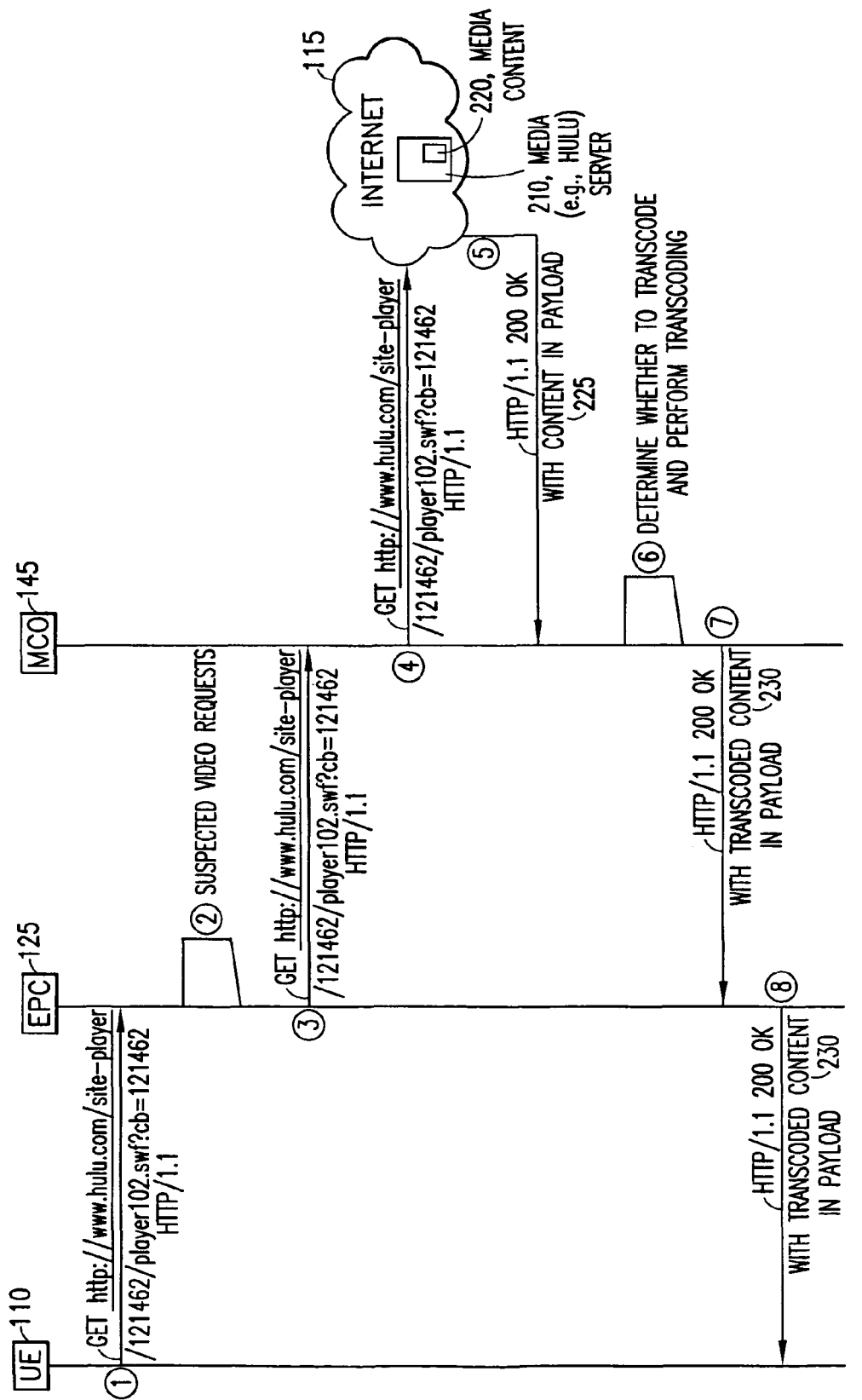
FIG. 2 is an example scenario illustrating how mobile optimization may be performed.

FIG. 2 is an example scenario illustrating how mobile optimization may be performed, and an exemplary sequence of operations is explained below. In this example, the EPC 125 is illustrated, but the actions taken by the EPC 125 may be performed by a single EPC node 165 (such as a PGW as shown in FIG. 1A).

1) The UE 110 is currently attached to an LTE (e.g., or 3G) network, and the UE makes an http request to, e.g., a HULU (a provider of television and other video) server to access video content: GET http://www.hulu.com/site-player/121462/player102.swf?cb=121462 HTTP/1.

2) The EPC 125 (e.g., the PGW/node 165) performs two level of packet processing, namely Layer-3 forwarding (like all routers) and Layer-7 processing called deep packet inspection (DPI). The DPI engine 157 at the gateway 165 (in this example) intercepts suspected http video requests (in this example) which contain content type of video/*, *mpegurl*, application/smil*, txt/xml*, which contain content-length>2 MB (greater than two megabytes) and which meet other policy-based filtering rules. That is, the DPI engine 157 intercepts the request because the request contains a type matching a type the DPI engine should intercept based on filtering rules. In an exemplary embodiment, the DPI engine 157 applies the filters on packets traveling via a hardwire line, and when one of the filters matches, the DPI takes an action in accordance with the filtering rules. It is noted the interception could be for other file types too, such as images, which could benefit from transcoding.

3) The DPI engine 157 forwards the http request from the UE 110 to the MCO 145 based on filtering rules that are satisfied. Otherwise, the DPI engine 157 forwards the http traffic directly to the Internet 115 when the request does not match the http video request, and this forwarding is not shown in the FIG. 2.

4) The MCO 145 further forwards the received http request to a HULU server 210 via the Internet 115.

5) The HULU server 210 responds with HTTP/1.1 200 OK with video content 225 (e.g., a portion of the media content 220) in the payload. Content 225 may be stored in memory as content 174.

6) The MCO engine 197 determines whether to transcode, and performs transcoding of the content 174. The content 225 may be stored as transcoded content 176 in the MCO 145. Transcoding involves converting video from one encoding to another encoding (e.g., high definition to standard definition, 3D to 2D), typically to reduce data rate. The MCO engine 197 may also perform transrating, where portions of or complete files are coded to a lower bit rate without changing video formats. Transrating typically reduces frame rate of the video. Transsizing may also be performed, where resolution of the video is changed (e.g., to fit a smaller screen). Optimization of the content 225 may therefore involve one or more of transcoding, transrating, transsizing, or any other manipulation of media content to modify bit rate of the media content.

7) The MCO 145 (e.g., under control of the MCO control unit 161) sends HTTP/1.1 200 OK with transcoded content 230 in the payload to EPC. The transcoded content 230 may be some or all of the transcoded content 176 in the MCO 145.

8) The EPC 125 forwards the http message, with the transcoded content 230, to the UE 110.

In existing systems, all the traffic referenced by the suspect video URLs (i.e., referencing video which may need to be transcoded) and which is intercepted by the DPI engine 157 at, e.g., the gateway 165 in the EPC 125 has to go through the MCO 145 even though some of these video files do not require any optimization (e.g., transcoding). This is a problem that could be remedied.

More specifically concerning this problem, while a lot of online video content has a mobile-friendly format, or cannot be compressed further, there is no mechanism in a mobile network before the content has been fetched to detect whether the specific content can be further optimized. As stated above, currently all the traffic contained in the suspecting video URLs has to be processed and sent by the MCO 145. This may cause unnecessary overload to the MCO 145.

The following exemplary and non-limiting issues are addressed by various exemplary embodiments herein.

How to avoid unnecessary traffic going through the MCO 145 even though this traffic fits into suspected video requirements (that is, meets criteria so that the video content should be examined for possible transcoding);

How to effectively parse the video streams to allow both optimized and non-optimized content to be flowing through the network; and/or How to provide a generic framework mechanism which must enable various policies to be applied by the operator.

At this moment, there is no standardized approach existing to address the above problems. Exemplary embodiments herein address these problems.

Exemplary mechanisms proposed herein enhance the existing mobile content optimization architecture to allow UE to mobile friendly contents directly. The invention in exemplary embodiments may perform one or more of the following:

1) Leverages the MCO 145 to recognize whether the original content is already optimized for the requested UE.

2) Presents an enhanced mobile optimization protocol which utilizes http redirect and special tags to allow the MCO 145 to redirect URL requests, which references (e.g., points to) already optimized content, and enables UE 10 access to such content by bypassing the MCO 145.

3) Proposes a tag negotiation protocol between the EPC 125 and the MCO 145 to make sure both EPC 125 and MCO 145 are aware of the tag for a particular URL transaction.

4) Develops secured mechanisms to avoid security risks potentially brought by an enhanced mobile content optimization architecture.

An exemplary embodiment of the invention provides an enhanced mobile video delivery protocol to enable the MCO 145 to offload already mobile-optimized video/image content, and allows the UE 110 to directly access this content. An exemplary network component that decides where to send video URL request may be a Serving GW (SGW) or PGW (e.g., a node 165) at the EPC 125, depending on where the DPI engine 157 is implemented. With the assistance of an MCO 145 and, e.g., a newly introduced protocol, the DPI engine 157 at the EPC 125 is able to differentiate whether the intended video/image content needs to be further optimized by the MCO 145, and forwards the URL request to either a server (e.g., 210), e.g., in the Internet 115 or to the MCO 145 based on such information.

Figure 3:
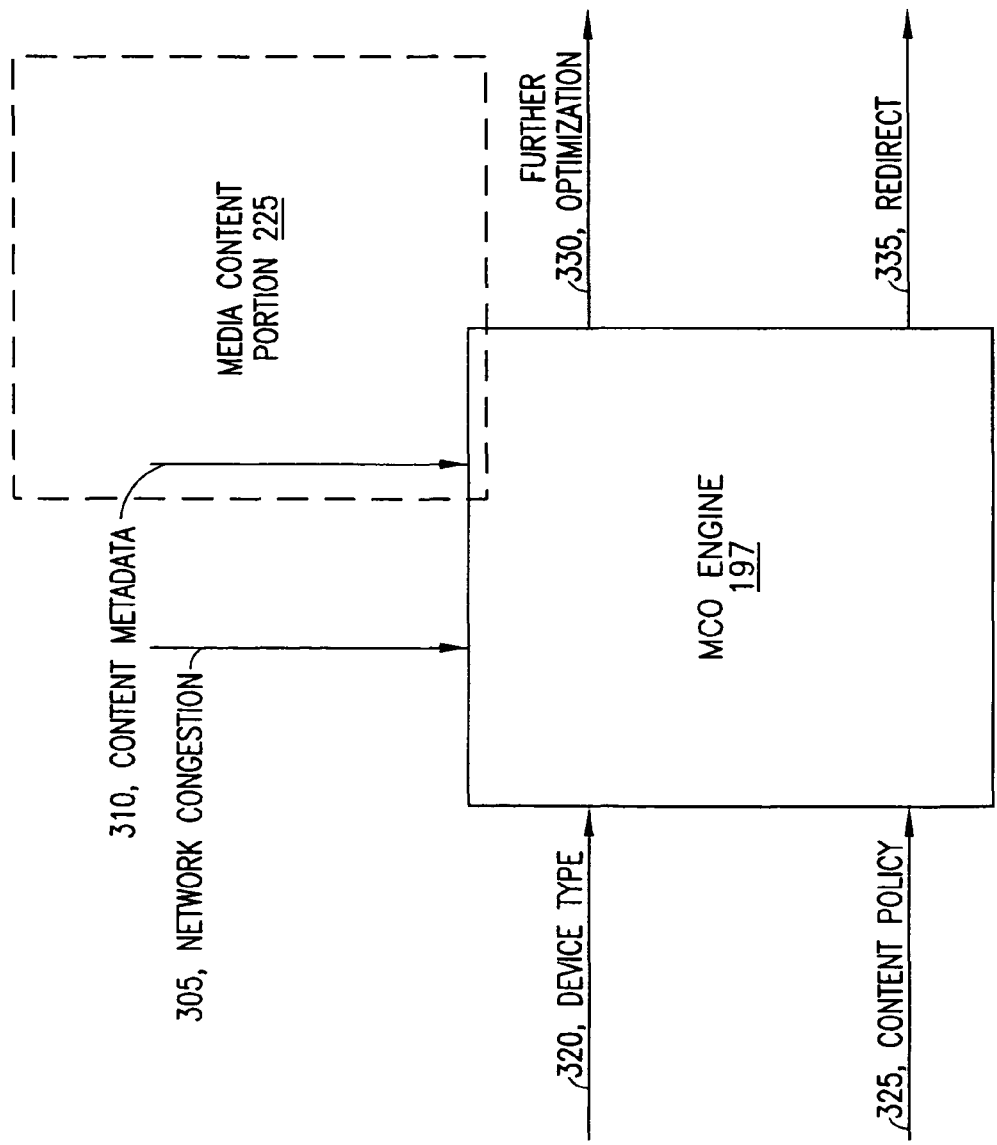
FIG. 3 illustrates how an MCO engine operates in an exemplary embodiment.

FIG. 3 illustrates how MCO engine 197 operates in an exemplary embodiment. Illustratively, based on content metadata 310 of intended content provided by an internet server (e.g., server 210), and other input information such as (user equipment 110's) device type 320, network congestion 305, and content policy 325, the MCO 145 can decide whether there is a need to further optimize 330 the intended content or redirect 335 the request for the content. Since the metadata 310 is contained in the first few packets of the media content 225, the MCO 145 can quickly draw a conclusion of whether mobile optimization (e.g., transcoding) is required. In this way, the load on MCO 145 can be reduced. In case of dynamic HTTP based streaming, metadata is contained in a manifest file. A manifest file, as is known, is a file comprising a list of servers, where each server contains different bitrates with file names, and a client has to determine which file to retrieve. A typical manifest file therefore contains information about how, when, and where video is stored. The MCO engine 197 in this example receives some media content portion 225 of the media content 220 from the media server 210. The media content portion 225 comprises the content metadata 310.

Figure 4:
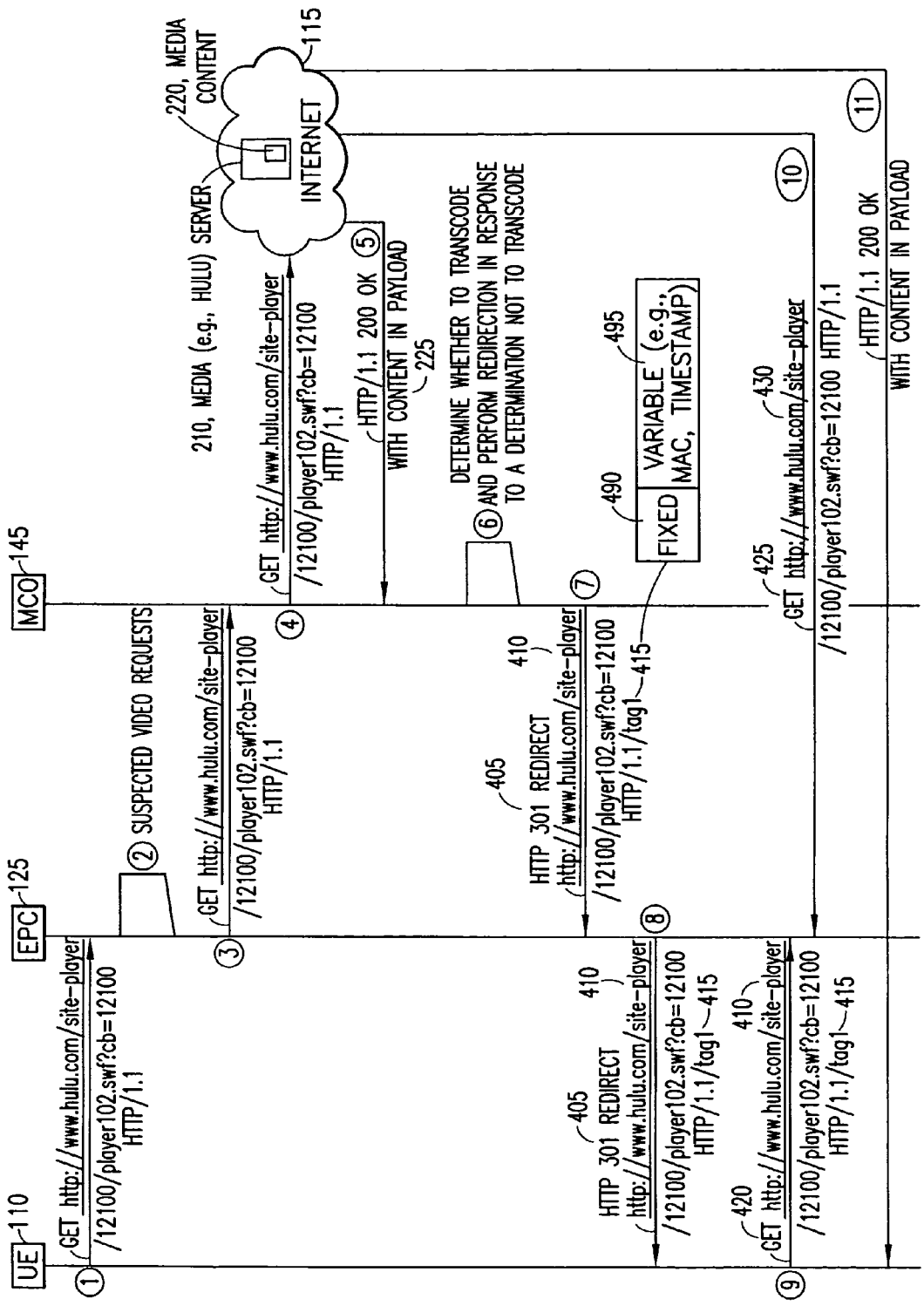
FIGS. 4 and 5 are example scenarios illustrating how mobile optimization may be performed in exemplary embodiments of the invention.

An exemplary proposed mechanism comprises the following operations, which are illustrated in FIG. 4. Steps 1 to 5 are the same as the existing mobile optimization approach as shown in FIG. 2.

Step 6: If the MCO 145 determines that the intended content does not need to be further optimized, the MCO 145 constructs a new URL 410 based on the original URL request and adds a special tag 415 (shown as "tag1") pre-negotiated between the EPC 125 and the MCO 145 to an end of the URL 410.

Step 7: The MCO uses http redirect to respond to the UE 110 with the newly constructed URL 410 (including added tag 415) in a redirect message 405.

Step 8: There are two exemplary implementation options (Options a and b) related to how the EPC 125 operates in response to the received http redirect message.

Option a: The EPC 125 does not retain the state of the modified URL and uses a stateless cookie mechanism, so that the EPC 125 passes (Step 8) the http redirect message 405 (e.g., URL 405) without changing the message 405. Upon receiving the http redirect message, the UE 110 sends an http GET message 420 (Step 9) with the URL 410, including the tag 415, contained inside the http redirect message 405. The EPC 125 intercepts this message 420, and performs a tag search of the message 420. If the tag 415 ("tag1") is found, that means the URL request (i.e., the Get message 420) contains mobile friendly content, and the EPC 125 extracts the tag 415 from the URL, forwards (Step 10) the new URL request 425 (with an URL 430 without the tag 415) to the content server 210. Otherwise, the URL request is forwarded to the MCO 145 for further processing. That is, if there is no tag 415, subsequent URL requests for the media are passed to the MCO 145. FIG. 4 presents the basic flow calls for this option. This approach is referred to herein as the "NON_TRANSPARENT_TAG" technique. The stateless cookie uses, in an exemplary embodiment, a two part tag scheme, the first part 490 is a fixed tag, and the second part 495 is a variable tag. Both these tags are generated and placed as part of the http redirect messages 405 towards the UE 110, and the UE 110, in response to receiving the http redirect message 405, is expected to make an http request 420 with the redirect tag 415. The redirect tag 415 arrives at the EPC and is inspected. The DPI engine 157 extracts the URI, and checks the fixed part 490 of the tag 415 first to confirm that the tag 415 was indeed generated by the DPI engine 157, and then uses a stateless cookie technique to validate the variable part 495 of the tag. In an example, the variable part 495 of the tag 415 contains MAC information. The variable part also contains the timestamp information to prevent against delayed replay attacks. The fixed part 490 may be typically negotiated between the EPC 125 and the MCO 145, and is any suitable fixed-size information (such as an instruction) useful for indicating the EPC is supposed to take steps to perform redirection of the original UE request to the media server 210 instead of back to the MCO 145.

Option b: See FIG. 5, of which Steps 1-7 are the same as in FIG. 4. When the EPC 125 intercepts (e.g., in response to Step 7) the http redirect message 405 from the MCO 145, the EPC 125 removes the tag 415, caches the URL 470 locally, and sends the http redirect message 445 with the URL 470 without the tag 415 (or, put a different way, the URL 470 is the URL 410 without the tag 415). Once the UE 110 receives the message 445, the UE 110 requests (Step 9, with GET message 450) the content based on the URL contained inside http redirect message 445. The EPC 125 receives this request and checks whether this request is already in the local cache. If yes, the request is forwarded (step 10) to the media server 210 in the Internet 115 directly. The media server 210 therefore responds (Step 11) to the request 450 by sending message 460 with content 465 in the payload. Since the inputs for making an offloading decision can be changed (e.g., network congestion 305 could improve such that there is less congestion, and there is no need for optimization of media content), the cache should be expired after certain time, and this time can be configurable. This approach is referred to herein as the "TRANSPARENT_TAG" technique.

Figure 5:
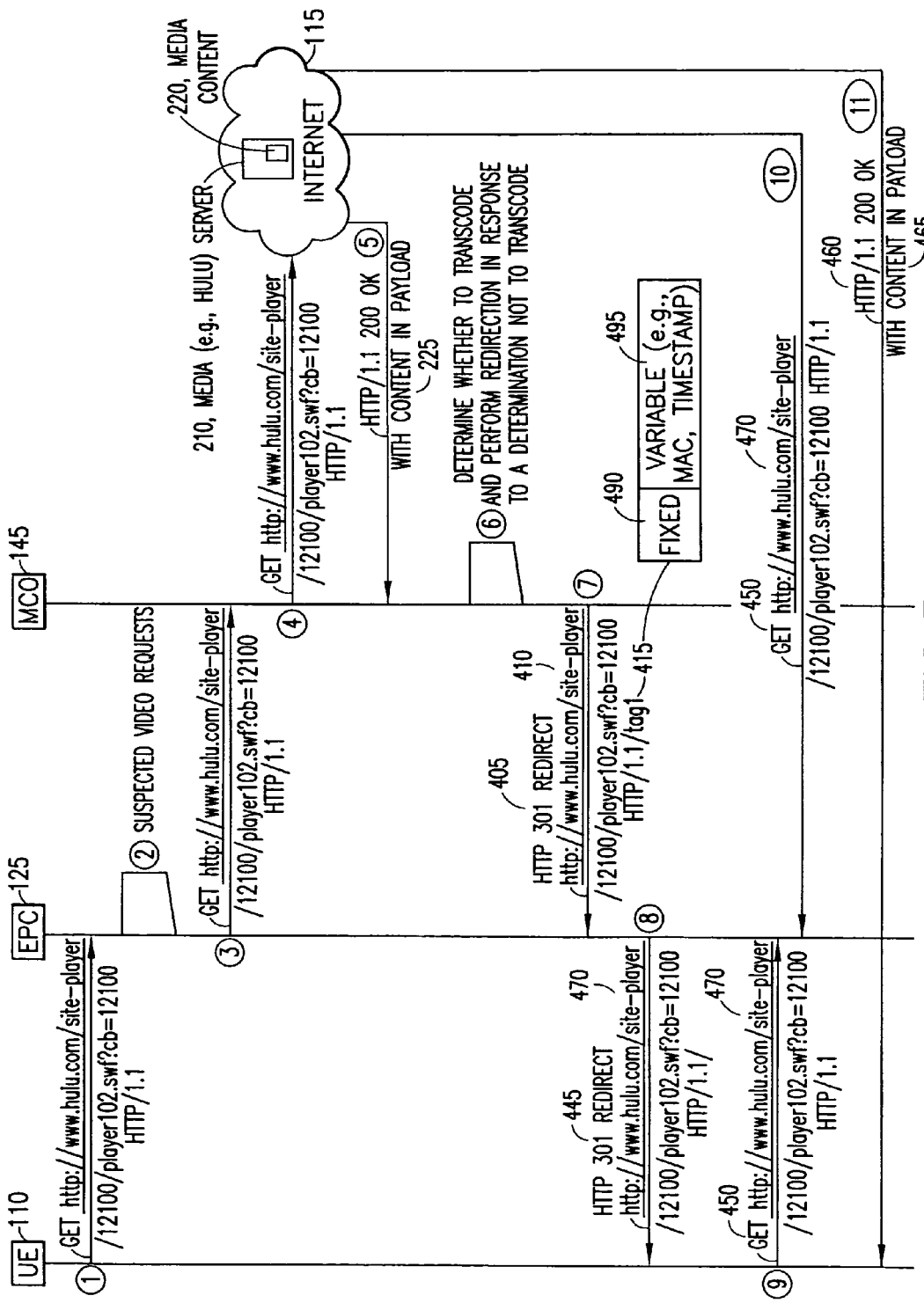
Figure 6:
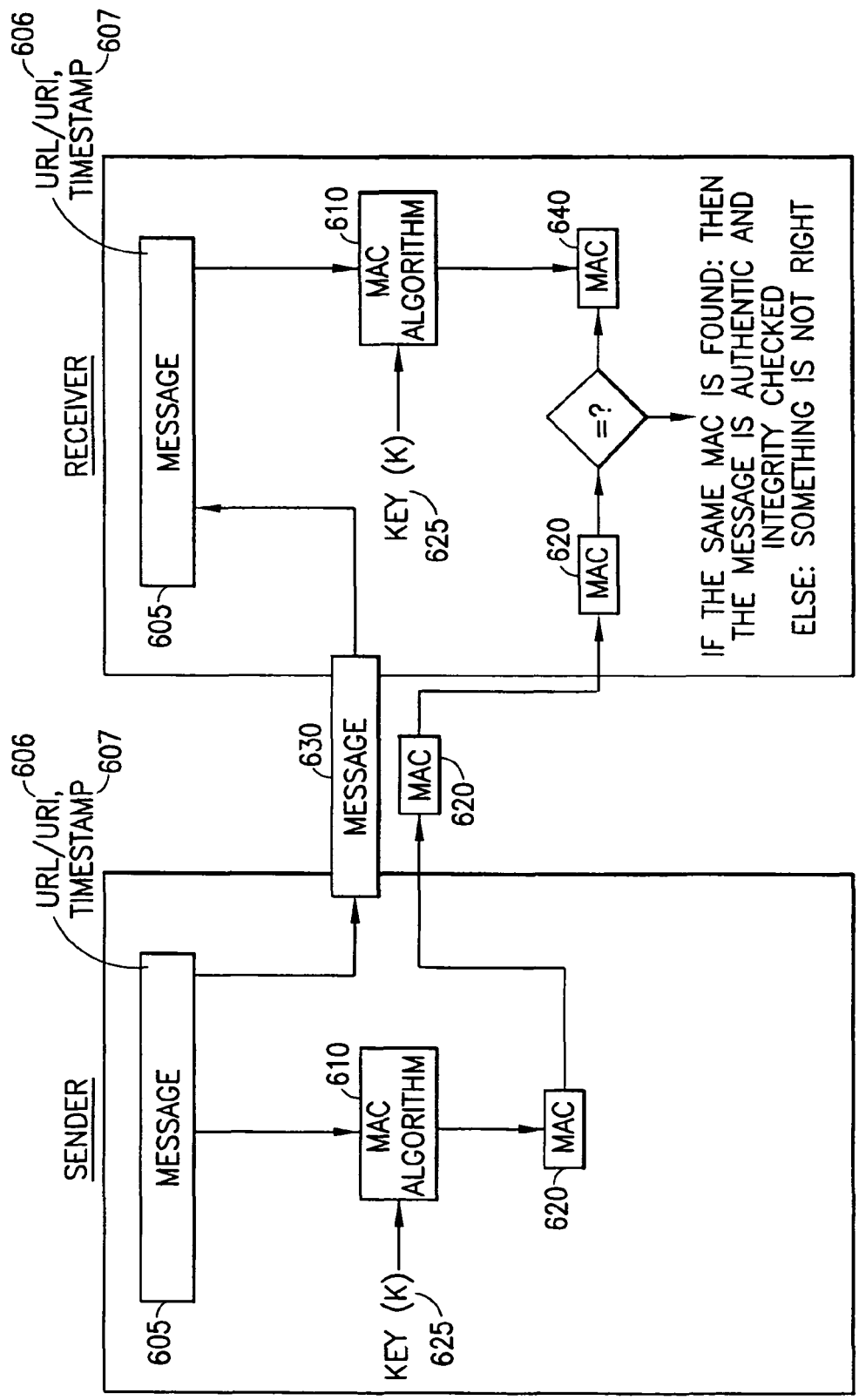
FIG. 6 illustrates an example of how MAC may be implemented in an exemplary embodiment.

Both Option a and b techniques may have a mechanism for tag creation, distribution, validation and protection, and tag lifetime control processes. In a traditional mobile network, the MCO 145 and the EPC 125 are within same secured domain, and the above approaches can be used as they are. However, operators are moving their services such as MCO services to the cloud. In this scenario, security becomes an issue, so a tag generation mechanism is used herein between the EPC 125 and the MCO 145, where a message authentication code (MAC) mechanism is to generate a portion of the tag 415. An example of how MAC may be implemented in an exemplary embodiment is shown in FIG. 6. In this example, the MAC=MAC algorithm(key, timestamp, URL/URI), i.e., the MAC 620 is equal to a MAC algorithm 610 applied to a key 625, a timestamp 607 (e.g., a timestamp corresponding to the GET message in Steps 1 of FIGS. 4 and 5), and an URL/URI 606. In FIG. 6, the message 605 includes the timestamp 607, and an URL/URI 606, and the message 630 includes the determined MAC 620. The receiver then splits the message 630 back into the message 605 and the MAC 620. The receiver applies the MAC algorithm 610 in the same manner as described above to the URL/URI 606, timestamp 607, and key (k) 625 to determine another MAC 640. If the MAC 640 matches the MAC 620, then the message is authentic and has been integrity checked. If the two MACs 620, 640 do not match, then something is not right, and operations may be taken (e.g., dropping the message 605) for this error. SSL is used to negotiate the keys, MAC algorithm, and which position that the tag is going to be inserted. Regarding position of the tag, in FIGS. 4 and 5, the tag 415 is shown at the end of the URL 410. However, the tag can be placed in the beginning of the URL 410 or any location within the URL 410, and the position of the tag 415 within the URL 410 may be changed according to some algorithm known to both sender and receiver. FIGS. 4 and 5 are merely exemplary. SSL is a protocol that provides secure communication between a client and a server. Either the EPC 125 or the MCO 145 can serve as a server in practice. SSL-based schemes are used as an example herein because SSL is commonly used in application layer security protocols. The instant approach is generic and any security protocols can be used that are appropriate for the application.

NON_TRANSPARENT_TAG (that is Option a) is simple to implement, as there is no need to maintain any state in the EPC 125. However, the EPC 125 passes (Step 8 in FIG. 4) the modified URL (i.e., with the tag 415) to the UE 110, the UE 110 may store and use this address in the future. When this happens, one of the inputs (e.g., network congestion 305, content policy 325) for MCO engine 197 may change, and directly fetching content from the content server 210 may not be optimized for the UE. To overcome this, each of those stateless tags 415 may have a timer associated with the tag 415, so that the freshness of the tag 415 can be validated by the EPC 125 after receiving the tags 415.

Further, it may happen that UE 110 moves to other wireless access technology such as WiFi, and the traffic does not go through the EPC 125, resulting in "URI/URL" not valid. That is, if the "NON_TRANSPARENT_TAG" technique is used, the UE 110 will be using the URL 410 with the tag 415 to access the media content 220. If the UE 110 moves from the mobile network to WiFi, the URL 410 (including the tag 415) is no longer valid when passed through WiFi as the tag 415 in the URL 410 is not part of the correct URL (i.e., URL 430) to the media content 220.

The TRANSPARENT_TAG (Option b) technique may use cache and cache management at EPC to overcome this problem caused by the tag 415 in an URL 410 that Option a encounters. Consequently, the implementation for Option b may be more complex compared to the implementation of Option a.

With security in mind, when the MCO engine 197 concludes that the intended mobile content should not be optimized, the MCO generates a MAC 620 based on key 625, URL/URI 606, and timestamp 607, and updates the URL of http redirect based on a rule negotiated by SSL. Upon receiving an http redirect message 630, the EPC 125 extracts the MAC 620 and compares the MAC 620 with its own computed MAC 640, and if the computed MAC 640 is same as the MAC 620 from EPC, the message is from a valid source (e.g., the UE 110 or the MCO 145). Otherwise, the message will be, e.g., dropped.

The introduction of security has impact on the implementation Option b. In the above mentioned Option b, it is assumed the tag 415 can be shared among all URLs. Since the secured tag generation is tied to an URL/URI 606, Option b may be modified to have an EPC cache URL, which is an URL used by the EPC but not the actual URL to the media content 220, inside an http redirect message (e.g., URL 470 within the redirect message 445 and also in the subsequent GET message 450). When the EPC 125 receives (see Step 7 of FIG. 4) the http redirect message 405 from the MCO 145, the EPC 125 records the URL while forwarding (see Step 8 of FIG. 8) the http redirect message 405 (but with a different URL called the EPC cache URL) to the UE 110. Then, the UE 110 receives the http redirect message 405, and sends (Step 9 of FIG. 4) http GET message 420 with redirect URL. The EPC intercepts this message, and checks whether the cache table (see FIG. 8) of the EPC 125 has this URL; if yes, http GET message (e.g., 425) is sent (Step 10 of FIG. 4) to server 210 in the Internet 115, otherwise, the message may be dropped. The cache content should be depleted after some time period (e.g., to prevent replay attacks), which may be configurable.

Figure 7:
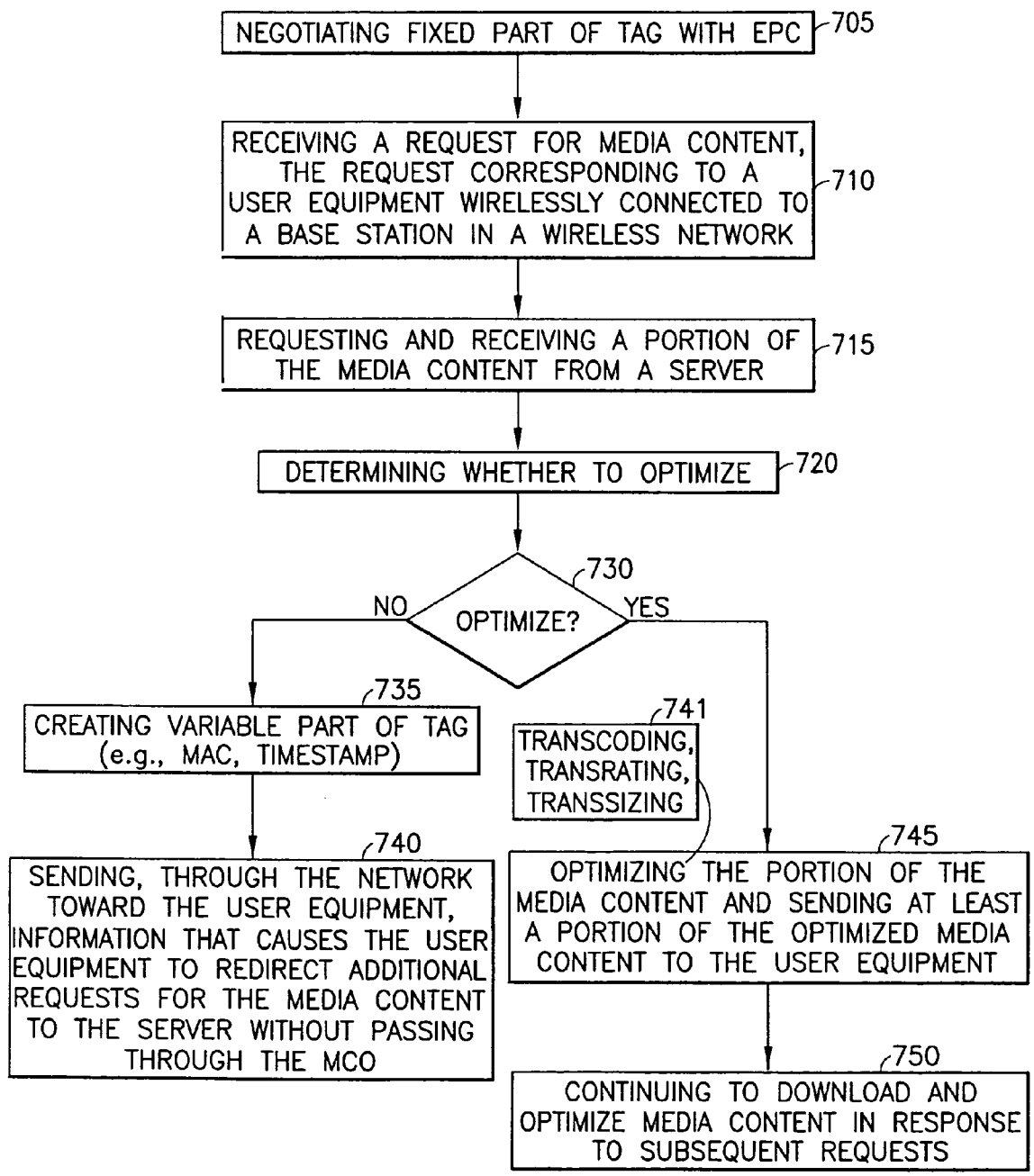
FIG. 7 is a block diagram of a flowchart performed by an MCO of a technique to support selective mobile content optimization.

Turning to FIG. 7, a block diagram is shown of a flowchart performed by an MCO of a technique to support selective mobile content optimization. The operations in the blocks of the flowchart may be performed by hardware (e.g., logic in one or more processors 175), software (e.g., computer program code 173 that is configured along with the one or more memories 171 and the one or more processors 175 to cause the MCO 145 to perform the operations herein), or some combination of these. Additionally, the operations in the blocks may be operations in a computer program product comprising a computer-readable storage medium bearing computer program code embodied therein for use with an apparatus, where the computer program code comprise code for performing operations.

The flowchart begins in block 705, when the MCO 145 negotiates the fixed part 490 of the tag 415 with the EPC node 165. The fixed part 490 has been described above. In block 710, the MCO 145 performs the operation of receiving a request for media content. The request corresponds to a user equipment wirelessly connected to a base station in a wireless network, as described above. In block 715, the MCO 145 performs requesting and receiving a portion 225 of the media content 220 from a server 210. In block 720, the MCO 145 determines whether to optimize the portion 225 (e.g., or content 174 as stored in MCO 145). Exemplary techniques for performing block 720 have been described above in reference to FIG. 3. Optimizing may include (as shown in block 741) one or more of transcoding, transrating, transsizing, or any other manipulation of media content to modify bit rate of the media content.

If block 730=Yes (i.e., optimizing should be performed), the MCO 145 performs (block 745) optimizing the portion of the media content (to create transcoded portion 230) and sending at least a portion (e.g., 465) of the optimized media content to the user equipment. It should be noted that FIG. 2 also illustrates one possible example of what might occur using the instant techniques, in response to a decision the content 225 should be optimized. That is, block 745 illustrates Steps 6 and 7 of FIG. 2. In block 750, the MCO 145 performs continuing (e.g., until MCO engine 197 inputs change) to download and optimize media content in response to subsequent requests from the UE for the media content.

If block 730=No (i.e., optimizing should not be performed), the MCO 145 performs creating the variable part 495 of the tag 415. The variable part 495 may include one or both of the MAC or timestamp information described above. The MAC information may include the MAC 620 as described above in reference to FIG. 6. It is noted that if security is not used between the EPC 125 and the MCO 145 (e.g., if both are within the same network), then the MAC may not be used. In block 740, the MCO 145 performs the operation of sending, through the network toward the user equipment, information (e.g., redirect message 145) that causes the user equipment to redirect additional requests for the media content to the server (e.g., having the media content) without passing through the apparatus (e.g., the MCO 145 in this example).

Figure 8:
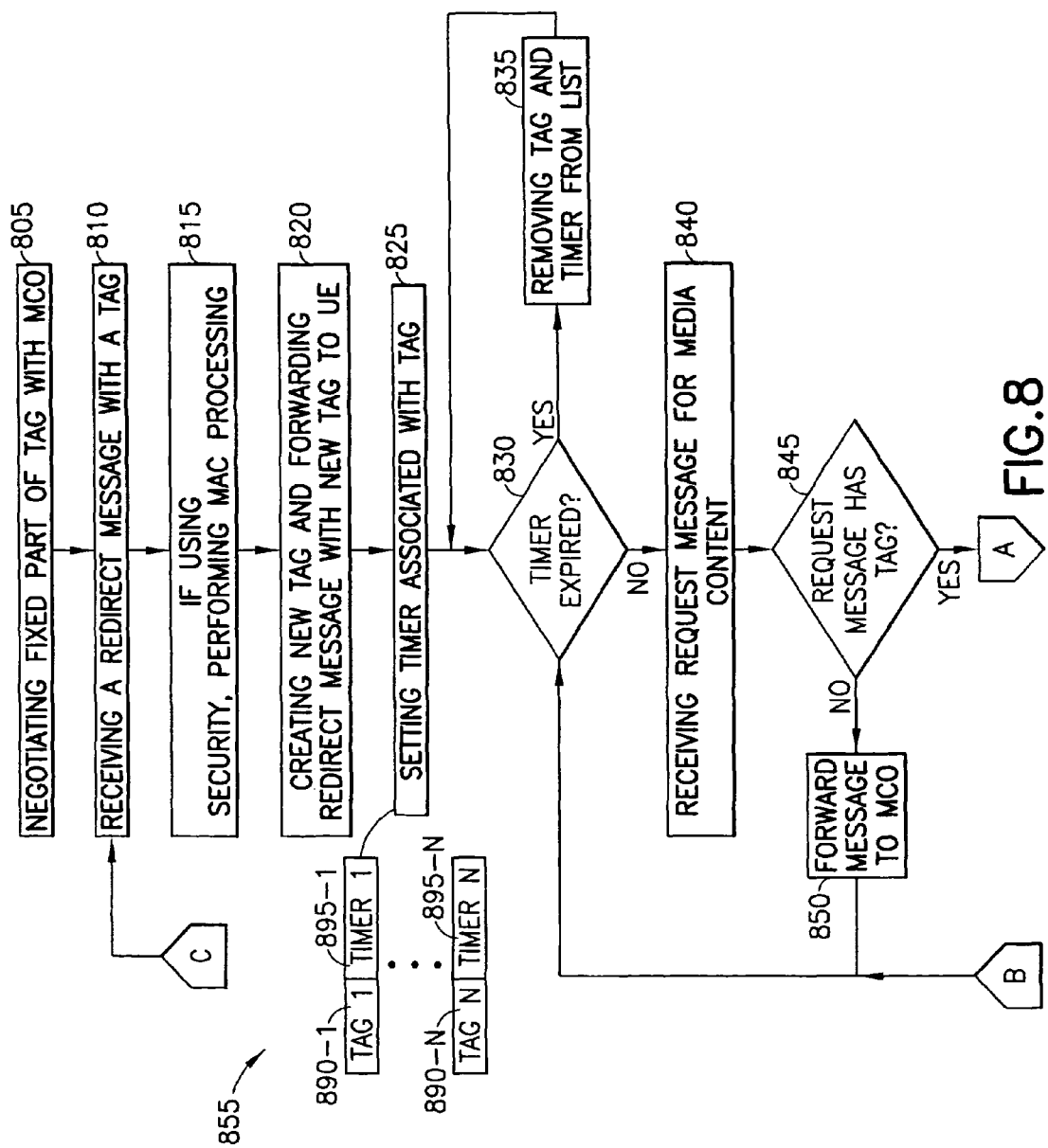
FIGS. 8 and 9 are block diagrams of flowcharts performed by a network node of techniques to support selective mobile content optimization.

Referring to FIG. 8, a block diagram is shown of a flowchart performed by a network (e.g., EPC) node of a "NON_TRANSPARENT_TAG" technique to support selective mobile content optimization. It is assumed herein that the blocks are performed by an EPC node 165, but there may be other network nodes that may be able to perform the operations in the blocks. The operations in the blocks of the flowchart may be performed by hardware (e.g., logic in one or more processors 160), software (e.g., computer program code 153 that is configured along with the one or more memories 150 and the one or more processors 160 to cause the node 165 to perform the operations herein), or some combination of these. Additionally, the operations in the blocks may be operations in a computer program product comprising a computer-readable storage medium bearing computer program code embodied therein for use with an apparatus, where the computer program code comprise code for performing operations.

The blocks in FIG. 8 may make it appear the blocks are performed in some order. However, the blocks are merely for ease of exposition and may not be performed in the order shown. Furthermore, some or all of the operations in the blocks may be performed in parallel. For instance, there may be a separate function which keeps checking whether the entries in cache are expired (e.g., using the timer described below), and once one entry is expired, that particular entry will be removed from the cache. This separate function may be performed in parallel with flow operations shown in FIG. 8 (and in FIG. 4).

Regarding the tags shown in FIG. 4 above and described below in FIG. 8, the tag (say tag1) that is generated by MCO and forwarded to EPC has relevance between MCO and EPC. This message and tag implies that EPC needs to handle redirection directly. The tag1 here is acting as an indication to the EPC and the EPC can communicate this information in its own way to the UE (via Option a or Option b). Upon receiving this tag (say, "tag1" as shown in FIGS. 4 and 5) notification, the EPC internally performs either Option a or Option b and it is typically up to EPC as to which option to select. Typically, the MCO is not aware of the selected option. Although in FIG. 4, it is suggested that the tag received from by the MCO is forwarded by the EPC to the UE. However, that need not be the case. In fact, the UE may receive a tag (say, "tag2") that is generated by EPC, and the EPC may not forward to the UE any tag that the EPC received from MCO directly. In this case, the EPC generates a new tag, e.g., tag2, that is forwarded as part of the redirect message to the UE. The techniques described above for creating a tag may be used to generate the new tag. FIG. 8 below assumes the EPC creates a new tag that is forwarded to the UE as part of a redirect message.

The flowchart in FIG. 8 (reference may also be made to FIG. 4 and other figures above) begins in block 805, where the EPC node 165 performs negotiating the fixed part 490 of the tag 415 with the MCO 145. This has been described above. In block 810, the EPC node 165 performs the operation of receiving a redirect message 405 with a tag 415 from the MCO 145. In block 815, if security is being used between the EPC node 165 and the MCO 145, the EPC node 165 performs the operation of performing MAC processing, as described above in reference to FIG. 6. If security is not being used between the EPC node 165 and the MCO 145, then MAC processing as in FIG. 6 would not need to be performed.

In block 820, the EPC node 165 performs the operations of creating a new tag and forwarding the redirect message 405 with the new tag (e.g., tag 415) to the UE 110. See also Step 7 of FIG. 4. In block 825, the EPC node 165 performs setting a timer 895 associated with the new tag (stored as one of the tags 890), e.g., in a list 855 (e.g., stored in the one or more memories 150). In this example, there are N timers 895 and corresponding N tags 890 in the list 855. The tags 890 may also have timestamps (as described above). In this case, values stored for times 895 may not be necessary, as the timestamps stored in the tags 890 may be used to determine whether a tag 890 has aged enough to be removed from the list 855.

In block 830, the EPC node 165 determines if a timer (for a particular tag 415/895) has expired (e.g., or if a certain time period has elapsed since the timestamp stored in a tag 415/895). If so (block 830=Yes), in block 835, the EPC node 165 performs removing the tag 890 and timer 895 from the list 855. As noted above, the blocks related to the timer and removal of entries based on the timer may occur in parallel with other blocks. The flow continues, e.g., in block 830, where another timer 895 may be selected (or block 830 can determine whether any one of the timers 895 have expired) (or may continue in block 875). If the timer has not expired (block 830=No), the EPC node 165 performs (block 840) receiving a request message (e.g., GET message 420 or a message for media content where the MCO will perform transcoding) for media content 220. In block 845, it is determined if the request message has a tag (e.g., by searching for the tag 415 in the message 420). If not (block 845=No), the EPC node 165 forwards the message to the MCO 145 in block 850 and the flow continues in block 830.

If the message (e.g., message 420 of FIG. 4) has a tag 415 (block 845=Yes), the EPC node 165 performs MAC processing (block 857) to validate the message 420 (and drop the message if the message 420 if the message is not validated). In block 860, if the message 420 is validated, the EPC node 165 performs stripping the tag 415 from the request message 420 and forwarding the revised request message 425 (including an URL 430 without the tag 415) to the media server 210. The EPC node 165 performs resetting a timer 895 that corresponds to the tag 890/415 in block 870. In block 875, it is determined if a redirect message has been received. If not (block 875=No), the flow continues in block 830; if so (block 875=Yes), the flow continues in block 810.

Figure 9:
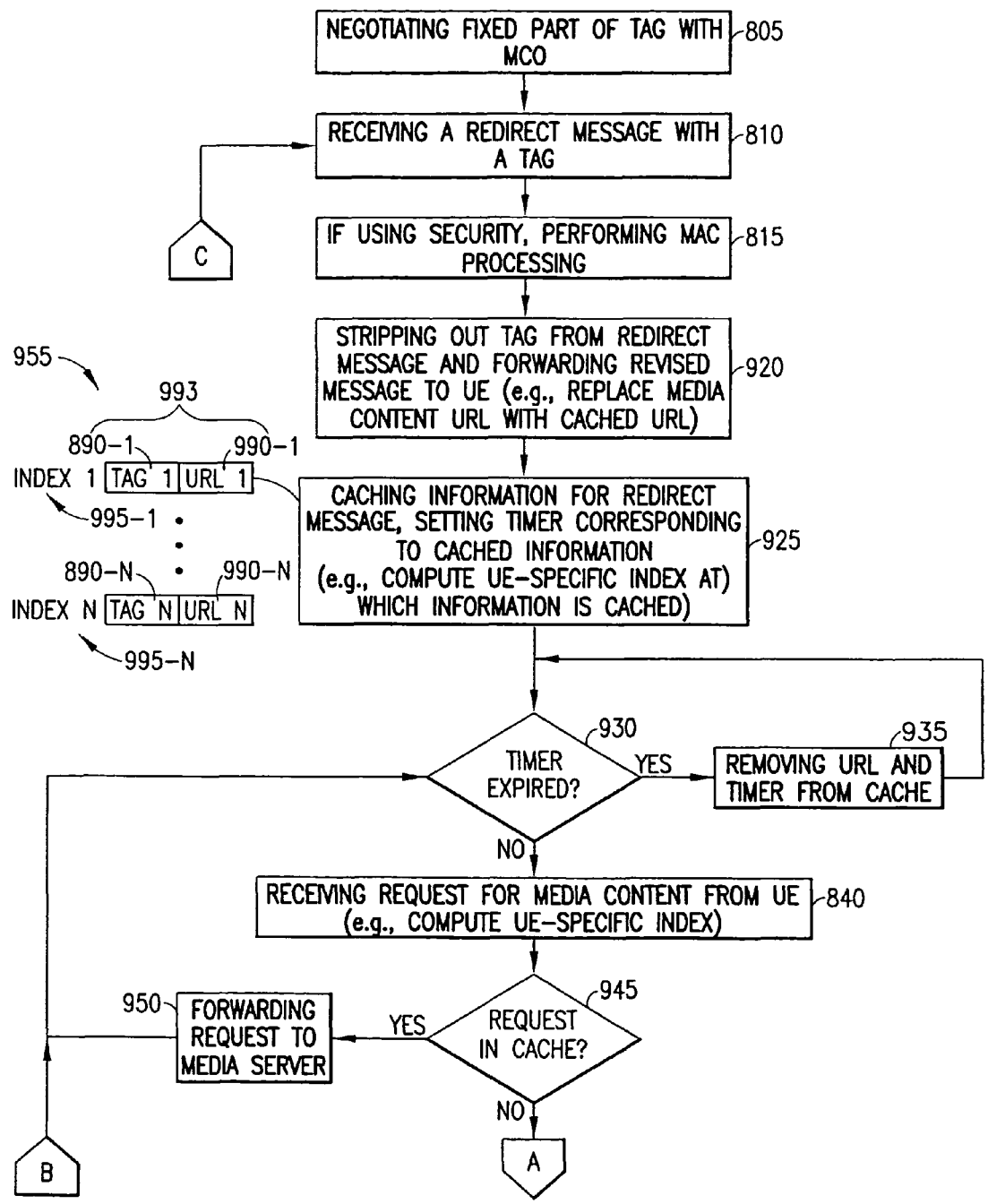
Figure 9:
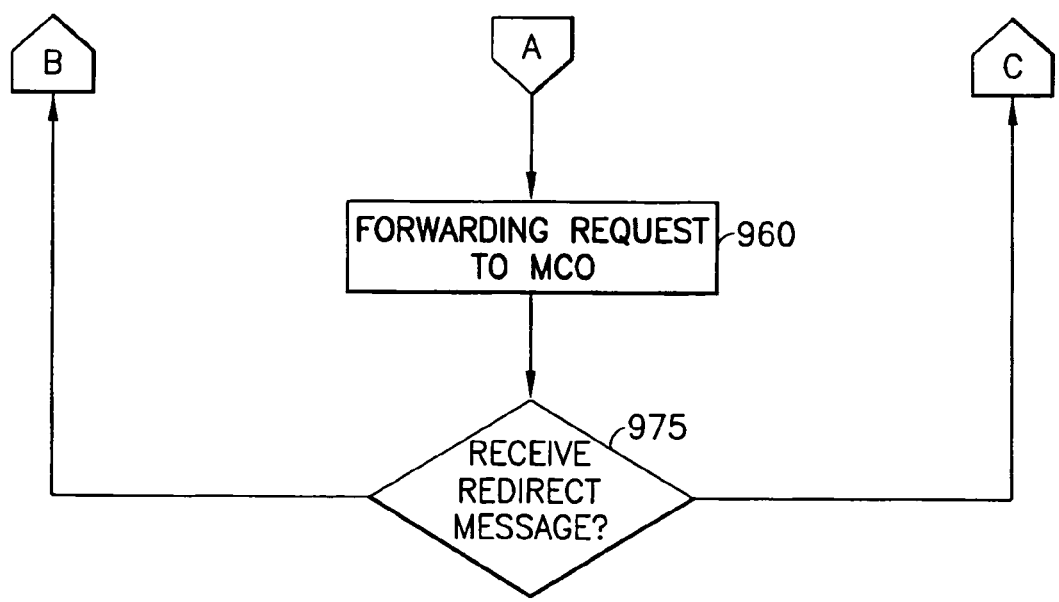

FIG. 9 is a block diagram of a flowchart performed by a network node of a "TRANSPARENT_TAG" technique to support selective mobile content optimization. It is assumed herein that the blocks are performed by an EPC node 165, but there may be other network nodes that may be able to perform the operations in the blocks. The operations in the blocks of the flowchart may be performed by hardware (e.g., logic in one or more processors 160), software (e.g., computer program code 153 that is configured along with the one or more memories 150 and the one or more processors 160 to cause the node 165 to perform the operations herein), or some combination of these. Additionally, the operations in the blocks may be operations in a computer program product comprising a computer-readable storage medium bearing computer program code embodied therein for use with an apparatus, where the computer program code comprise code for performing operations.

The blocks in FIG. 9 may make it appear the blocks are performed in some order. However, the blocks are merely for ease of exposition and may not be performed in the order shown. Furthermore, some or all of the operations in the blocks may be performed in parallel. For instance, there may be a separate function which keeps checking whether the entries in cache are expired (e.g., using the timer described below), and once one entry is expired, that particular entry will be removed from the cache. This separate function may be performed in parallel with flow operations shown in FIG. 9 (and in FIG. 5).

Reference may also be made to FIG. 5, along with other figures described above. Blocks 805, 810, and 815 in FIG. 9 have been described above in reference to FIG. 8. In block 920, the EPC node 165 performs stripping out the tag 415 from the redirect message 405 and forwarding the revised message 445 to the UE 110. The revised message includes the URL 470. See also Steps 7 and 8 of FIG. 4. In block 925, the EPC node 165 performs caching information (such as the URL 470, e.g., URL 410 without the tag 415, and the tag 415/890) for the redirect message as an URL 990 and setting a timer, associated with the cached information 993, to expire after a certain time period. A timestamp in the tag 890 may also be used to set the timer (e.g., with a value a certain time period after the timestamp). In this example, a cache 955 is shown, which would be stored in, e.g., the one or more memories 150. In this example, the cache 955 contains information 993, each piece of information 993 comprising one of N URLs 990 and a corresponding one of N tags 890.

One exemplary technique for caching the information 993 is to perform a calculation that creates an index 995 that is specific to the UE 110. In an example, an index 995 corresponds to a computation based on, e.g., the IP address of the UE, a GTP tunnel address (or identification), requested URL, and using, e.g., a MAC 620 in the variable part 495 of the tag 415 as a seed to the computation. The computation produces a unique value that is used as an index 995 into the cache 955. The computation and indexing are optional but do speed up cache access.

In block 930, the EPC node 165 determines if a timer (corresponding to an URL 990/415 and tag 890) has expired. If so (block 930=Yes), then the EPC node 165 performs (block 935) removing the URL 990 and the corresponding tag 890 from the cache 955. As noted above, the blocks related to the timer and removal of entries based on the timer may occur in parallel with other blocks. The flow may continue in block 930, e.g., where another timer may be selected (or block 930 can determine whether any one of the timestamps in the tags 890 has expired) (or may continue in block 975).

If a timer has not expired (block 930=No), the EPC node 165 receives a request 450 from the UE 110 in block 940. The request can be a request that corresponds or does not correspond to an entry in the cache 955. In block 945, the EPC node 165 determines if the request (e.g., request 450) is in the cache 955, e.g., by computing the index 995 in the manner described above and access the cache 955 by using the index 995. The EPC node 165 then compares the URL 470 with URL 990 to determine if there is a match. If so (block 945=Yes), in block 950, the EPC node 165 performs (block 950) forwarding the request 450 to the media server 210. Otherwise (block 945=No), the EPC node 165 performs (block 960) forwarding the request to the MCO 145. In block 975, it is determined if a redirect message is received. If so (block 975=Yes), the flow continues in block 810; otherwise (block 975=No), the flow continues in block 930.

It should be noted that the information 993 is shown as tags 890 and URLs 990. This information 993 is merely exemplary. For instance, perhaps only the URLs 990 are stored and the tags 890 are not stored in the cache.

Exemplary embodiments of the instant invention include one or more of the following, as non-limiting examples:

Exemplary proposed mechanisms enable the mobile content optimizer to offload its unwanted traffic to allow UE to access this content directly. This approach reduces the possibility of performance overload at MCO, and improves a load balance between an EPC-Internet link and an MCO-Internet link.

There is no change required from the UE side; hence the legacy UE can also be supported to leverage the proposed scheme.

Exemplary proposed mechanisms do not break any application layer protocols.

Exemplary proposed mechanisms work seamlessly across any devices and device specific capabilities.

Exemplary proposed mechanisms can be applied to any video optimization mechanisms and not restricted to in-band and out-band optimizers.

Trigger mechanisms proposed herein are general and can be applied to situations where one or more of the conditions need to be optimized.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1A. A computer-readable medium may comprise a computer-readable storage medium (e.g., memories 150, 171 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
receiving at an apparatus a request for media content, the request corresponding to a user equipment wirelessly connected to a base station in a wireless network;
requesting and receiving by the apparatus a portion of the media content from a media server; and
responsive to a determination the requested media content should not be optimized, sending, through the network toward the user equipment, by the apparatus information that causes a network node to direct additional requests from the user equipment for the media content through the network toward the media server without passing through the apparatus.

2. The method of claim 1, wherein the information comprises an address of the media server.

3. The method of claim 1, further comprising responsive to a determination the media content should be optimized, optimizing the portion of the media content to create optimized media content and sending the optimized media content to the user equipment.

4. The method of claim 3, wherein optimizing further comprises performing one or more of transcoding, transrating, or transsizing the portion of the media content to create the optimized media content.

5. The method of claim 1, further comprising determining whether the media content should be optimized.

6. The method of claim 5, wherein determining whether the media content should be optimized further comprises determining whether the media content should be optimized based at least on metadata corresponding to the media content.

7. The method of claim 6, wherein determining whether the media content should be transcoded based at least on metadata corresponding to the media content and provided by the media server comprises determining whether the media content should be transcoded based at least on the metadata and on one or more of congestion status of wireless network congestion corresponding to at least a wireless link from the base station to the user equipment, a device type of the user equipment, or one or more content policies.

8. The method of claim 1, wherein the information comprises a tag comprising at least a fixed part.

9. The method of claim 8, wherein the tag further comprises a variable part comprising a message authenticate code and a timestamp corresponding to the request for the media content, and wherein the method further comprises determining the message authenticate code using at least the timestamp, a key, and an indication corresponding to a location of the media content on a network.

10. The method of claim 1, performed by a media content optimizer.

11. A method, comprising:
receiving at a first apparatus in a network from a second apparatus in the network a redirect message comprising an indication corresponding to a location of media content on a network and comprising a tag indicating the redirect message should cause the first apparatus to redirect requests from a user equipment for the media content to a media server having the media content without passing through the second apparatus; and
for requests received from the user equipment and corresponding to the indication corresponding to the location of the media content on the network, forwarding associated requests through the network toward the media server.

12. The method of claim 11, wherein the tag is a first tag, wherein the requests comprise requests comprising a second tag, and wherein forwarding associated requests further comprises forwarding a portion of requests received from the user equipment and comprising the second tag toward the media server.

13. The method of claim 12, further comprising:
determining by the first apparatus the second tag; and
forwarding from the first apparatus to the user equipment the redirect message including the indication and the second tag.

14. The method of claim 12, wherein the requests received from the userequipment comprise requests not comprising the second tag, and wherein forwarding further comprises forwarding the requests not comprising the second tag toward the second apparatus.

15. The method of claim 12, wherein the requests comprising the second tag comprise the indication corresponding to the location of media content on the network, the second tag embedded in the indication, and forwarding further comprises stripping the second tag from the indication and forwarding the indication without the second tag toward the media server.

16. The method of claim 11, wherein forwarding further comprises forwarding requests toward the media server in response to the requests comprising second indications deemed to correspond to the indication in the redirect message.

17. The method of claim 16, further comprising forwarding requests toward the second apparatus in response to the requests comprising second indications deemed not to correspond to the indication in the redirect message.

18. The method of claim 16, wherein the redirect message is a first redirect message, and wherein the method further comprises sending in a second redirect message the indication but not the tag toward the user equipment through the network, wherein the requests comprising second indications are deemed to correspond to the indication in the first redirect message in response to the second indications matching the indication in the first redirect message.

19. The method of claim 11, wherein the indication comprises one of a uniform resource locator or a uniform resource identifier.

20. The method of claim 11, performed by a network node in an evolved packet core.

* * * * *